US00RE39978E

(19) United States
(12) Reissued Patent
Bieman

(10) Patent Number: US RE39,978 E
(45) Date of Reissued Patent: Jan. 1, 2008

(54) SCANNING PHASE MEASURING METHOD AND SYSTEM FOR AN OBJECT AT A VISION STATION

(75) Inventor: Leonard H. Bieman, Waterford, MI (US)

(73) Assignee: Ismeca Europe Semiconductor SA, La Chaux-de-Fonds (CH)

(21) Appl. No.: 09/111,978

(22) Filed: Jul. 8, 1998

Related U.S. Patent Documents

Reissue of:
(64) Patent No.: 5,646,733
Issued: Jul. 8, 1997
Appl. No.: 08/593,095
Filed: Jan. 29, 1996

(51) Int. Cl.
*G01B 11/24* (2006.01)

(52) U.S. Cl. ..... 356/604; 250/237 G
(58) Field of Classification Search ..... 356/601–623, 356/364, 365, 369, 376, 374, 375, 371, 354, 356/355, 356, 357; 250/237 G, 558
See application file for complete search history.

(56) References Cited

U.S. PATENT DOCUMENTS

| | | | | | |
|---|---|---|---|---|---|
| 3,614,237 | A | * | 10/1971 | Kyle | 356/376 |
| 3,762,818 | A | * | 10/1973 | Johnson et al. | 356/376 |
| 3,814,521 | A | * | 6/1974 | Free | 356/376 |
| 4,212,073 | A | | 7/1980 | Balasubramanian | 364/562 |
| 4,639,139 | A | | 1/1987 | Wyant et al. | 356/359 |
| 4,641,972 | A | | 2/1987 | Halioua et al. | 356/376 |
| 4,794,550 | A | | 12/1988 | Greivenkamp, Jr. | 364/562 |
| 5,069,548 | A | | 12/1991 | Boehnlein | 356/376 |
| 5,085,502 | A | | 2/1992 | Womack et al. | 356/376 |
| 5,118,192 | A | | 6/1992 | Chen et al. | 356/376 |
| 5,135,308 | A | * | 8/1992 | Kuchel | 356/376 |
| 5,202,749 | A | | 4/1993 | Pfister | 356/376 |
| 5,307,152 | A | | 4/1994 | Boehnlein et al. | 356/376 |

(Continued)

OTHER PUBLICATIONS

Yang, H.S., et al., "Determination of the identity, position and orientation of the topmost object in a pile: some further experiments", *1986 IEEE Int'l Conf on Robotics and Automation* (Cat No. 86CH2282–2) San Francisco, CA, vol. 1 XP002118970, 293–298, (4–7–10–86).
Mather, D.R., et al., "Machine Vision Inspection for the Challenges of Ramped–Up DVD Production", *Advanced Imaging,* 55–57, (May 1997).

*Primary Examiner*—Hoa Q. Pham
(74) *Attorney, Agent, or Firm*—Charles A. Lemaire; Lemaire Patent Law Firm, PL.L.C.

(57) ABSTRACT

A method and system are provided including an optical head which moves relative to an object at a vision station to scan a projected pattern of imagable electromagnetic radiation across the surface of an object to be inspected at a relatively constant linear rate to generate an imagable electromagnetic radiation signal. In one embodiment, the electromagnetic radiation is light to develop dimensional information associated with the object. The optical head includes at least one projector which projects a grid of lines and an imaging subsystem which includes a trilinear array camera as a detector. The camera and the at least one projector are maintained in fixed relation to each other. Three linear detector elements of the array camera extend in a direction parallel with the grid of lines. The geometry of the optical head is arranged in such a way that each linear detector element picks up a different phase in the grid pattern. As the optical head is scanned across the surface of interest, the detector elements are continuously read out. Depth an each point on the surface is calculated from the intensity reading obtained from each of the detector elements that correspond to the same point on the surface. In this way, the phases of the pattern are calculated from the three intensity readings obtained for each point. In another embodiment, the imagable electromagnetic radiation is polarized and the response of the detector elements is polarization sensitive. The generated images are based on polarization for the surface.

29 Claims, 4 Drawing Sheets

U.S. PATENT DOCUMENTS

| | | | | | |
|---|---|---|---|---|---|
| 5,309,222 | A | | 5/1994 | Kamei et al. | 356/371 |
| 5,319,445 | A | | 6/1994 | Fitts | 356/376 |
| 5,343,294 | A | | 8/1994 | Kuchel et al. | 356/376 |
| 5,355,221 | A | | 10/1994 | Cohen et al. | 356/359 |
| 5,398,113 | A | | 3/1995 | de Groot | 356/360 |
| 5,450,204 | A | | 9/1995 | Shigeyama et al. | 356/378 |
| 5,463,227 | A | | 10/1995 | Stern et al. | 250/559.29 |
| 5,465,152 | A | | 11/1995 | Bilodeau et al. | 356/371 |
| 5,471,308 | A | * | 11/1995 | Zeien | 356/376 |
| 5,488,478 | A | * | 1/1996 | Bullock et al. | 356/376 |
| 5,546,189 | A | | 8/1996 | Svetkoff et al. | 356/376 |
| 5,561,525 | A | | 10/1996 | Toyonaga et al. | 356/360 |
| 5,621,530 | A | | 4/1997 | Marrable, Jr. | 356/394 |
| 5,636,025 | A | | 6/1997 | Bieman et al. | 356/374 |
| 5,644,392 | A | | 7/1997 | Soest et al. | 356/237 |
| 5,646,733 | A | | 7/1997 | Bieman | 356/376 |
| 5,680,215 | A | | 10/1997 | Huber et al. | 356/371 |
| 5,687,209 | A | | 11/1997 | Adams | 378/22 |
| 5,734,475 | A | | 3/1998 | Pai | 356/375 |
| 5,745,986 | A | | 5/1998 | Variot et al. | 29/840 |
| 5,753,904 | A | | 5/1998 | Gil et al. | 250/222.1 |
| 5,766,021 | A | | 6/1998 | Pickles et al. | 439/70 |

* cited by examiner

SCANNING PHASE MEASURING METHOD AND SYSTEM FOR AN OBJECT AT A VISION STATION

Matter enclosed in heavy brackets [ ] appears in the original patent but forms no part of this reissue specification; matter printed in italics indicates the additions made by reissue.

CROSS-REFERENCE TO RELATED APPLICATION

This application is related to U.S. patent application entitled "Optical Measuring System" filed Jun. 17, 1994 and having U.S. Ser. No. 08/262,130.

TECHNICAL FIELD

This invention relates to non-invasive measuring methods and systems and, in particular, to scanning phase measuring methods and systems for an object at a vision station.

BACKGROUND ART

Height distribution of a surface can be obtained by projecting a light stripe pattern onto the surface and then reimaging the light pattern that appears on the surface. A powerful technique for extracting this information based on taking multiple images (3 or more) of the light pattern that appears on the surface while shifting the position (phase) of the projected light stripe pattern is referred to as phase shifting interferometry as disclosed in U.S. Pat. Nos. 4,641,972 and 4,212,073.

The multiple images are usually taken using a CCD video camera with the images being digitized and transferred to a computer where phase shift analysis, based on images being used as "buckets," converts the information to a contour map of the surface.

The techniques used to obtain the multiple images are based on methods that keep the camera and viewed surface stationary with respect to each other and moving the projected pattern.

A technique for capturing just one bucket image using a line scan camera is described in U.S. Pat. No. 4,965,665 but not enough information is available to do a phase calculation based on multiple buckets.

Other U.S. patents which show phase shifting include U.S. Pat. Nos. 5,202,749 to Pfister; 4,794,550 to Greivenkamp, Jr.; 5,069,548 to Boehnlein; and 5,307,152 to Boehnlein et al.

U.S. Pat. Nos. 5,398,113 and 5,355,221 disclose white light interferometry systems which profile surfaces of objects.

In the above-noted application, an optical measuring system is disclosed which includes a light source, gratings, lenses, and camera. A mechanical translation device moves one of the gratings in a plane parallel to a reference surface to effect a phase shift of a projected image of the grating on the contoured surface to be measured. A second mechanical translation device moves one of the lenses to effect a change in the contour interval. A first phase of the points on the contoured surface is taken, via a four-bucket algorithm, at a first contour interval. A second phase of the points is taken at a second contour interval. A control system, including a computer, determines a coarse measurement using the difference between the first and second phases. The control system further determines a fine measurement using either the first or second phase. The displacement or distance, relative to the reference plane, of each point is determined, via the control system, using the fine and coarse measurements.

SUMMARY OF THE INVENTION

An object of the present invention is to provide a method and system including an optical head for making an optical phase measurement of a viewed object by generating an image whose intensity as a function of position relative to the optical head and wherein the system is configured in a way which allows multiple images with different phase information as the viewed object is moved in a direction perpendicular to the imaging system and these multiple images are used to calculate a phase image that is proportional to the optical phenomena that creates the phase change.

Another object of the present invention is to provide a method and system including an optical head for making a phase measurement of imagable electromagnetic radiation returned to a multi-line linear detector array by setting up the optics in the optical head in a manner such that a different phase value is imaged onto each line of the detector array such that each line of the detector array creates an image with a different optical phase value for the same point on the imaged object.

Yet still another object of the present invention is to provide a method and system including an optical head for scanning the height of a surface wherein the optical head includes a light stripe projector and imaging system where the projected pattern does not move relative to the imaging system and the optical head is configured in a way which allows multiple images with different phase information as the surface is moved with respect to the imaging system and these multiple images are used to calculate a phase image that is proportional to the height of the scanned surface.

In carrying out the above objects and other objects of the present invention, a method is provided for high speed scanning phase measuring of an object at a vision station to develop physical information associated with the object. The method includes the steps of projecting a pattern of imagable electromagnetic radiation with at least one projector and moving the object relative to the at least one projector at the vision station to scan the projected pattern of electromagnetic radiation across a surface of the object to generate an imagable electromagnetic radiation signal. The method also includes the steps of receiving the imagable electromagnetic radiation signal from the surface of the object with a detector having a plurality of separate detector elements and maintaining the at least one projector and the detector in fixed relation to each other. Finally, the method includes the steps of measuring an amount of radiant energy in the received electromagnetic radiation signal wherein the detector elements produce images having different phases of the same scanned surface based on the measurement and computing phase values and amplitude values for the different phases from the images.

In one embodiment, preferably the physical information is dimensional information and the imagable electromagnetic radiation is light.

In another embodiment, preferably the physical information is polarization information, the imagable electromagnetic radiation is polarized, a response of the detector elements is polarization-sensitive and the images are based on polarization from the surface.

Further in carrying out the above objects and other objects of the present invention, a system is provided for carrying out the above method steps.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
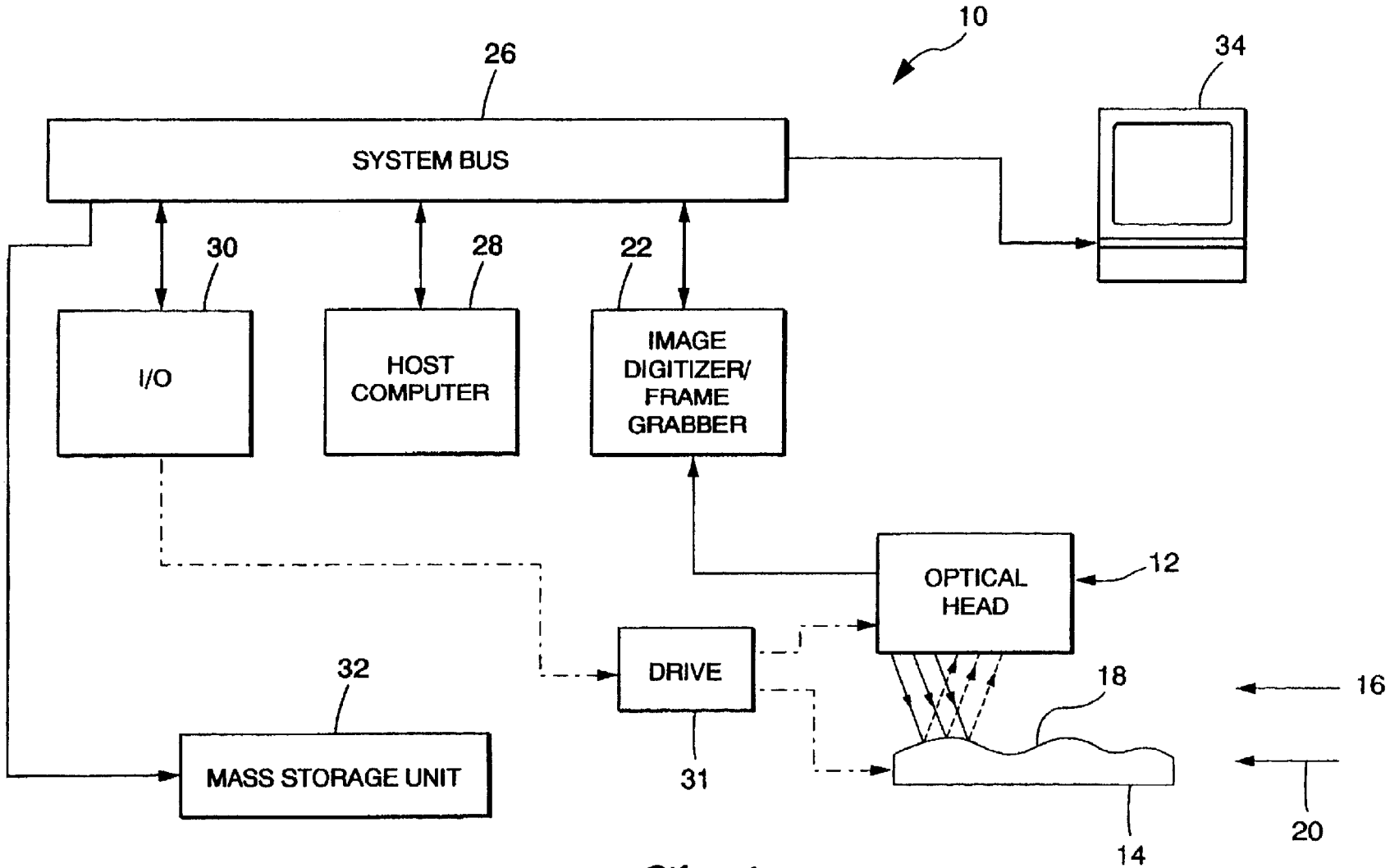
FIG. 1 is a schematic view of a machine vision system including an optical head for carrying out the method and system of the present invention.

Referring now to FIG. 1, there is illustrated schematically a machine vision system, generally indicated at 10, including an optical head, generally indicated at 12, for carrying out the method of the present invention. The method and system 12 of the present invention are provided for high speed, scanning phase measuring of an object 14 at a vision station 16 to develop dimensional information such as height information of a surface 18 of the object 14. The object 14 moves relative to the optical head 12 as indicated by arrow 20.

In general, the invention relates to the non-invasive three-dimensional measurement of surface contours using technology such as moire technology with a novel approach that allows continuous scanning of a surface. A more general adaptation of this approach allows the measurement of other optical parameters via the same scanning approach but with a different optical configuration.

The machine vision system 12 typically includes an image digitizer/frame grabber 22 electrically coupled to the optical head 12. The image digitizer/frame grabber 22 samples and digitizes the input images from an image source such as a camera contained within the optical head 12 as described in detail herein below. The frame grabber 22 places each input image into a frame buffer having picture elements. Each of the picture elements may consist of an 8-bit number representing the brightness of that spot in the image.

The system 10 also includes a system bus 26 which receives information from the image digitizer/frame grabber 22 and passes the information on to the IBM compatible host computer such as a Pentium PC 28.

The system 10 may include input/output circuits 30 to allow the system 10 to communicate with one or more external peripheral devices such as a drive 31 or robots, programmable controllers, etc. having one or more stages. The drive 31 provides relatively uniform and continuous movement between the object 14 and the head 12. The I/O circuits 30 may support a three axis stepper board (i.e. supports multiple axis control) or other motion boards.

Figure 2:
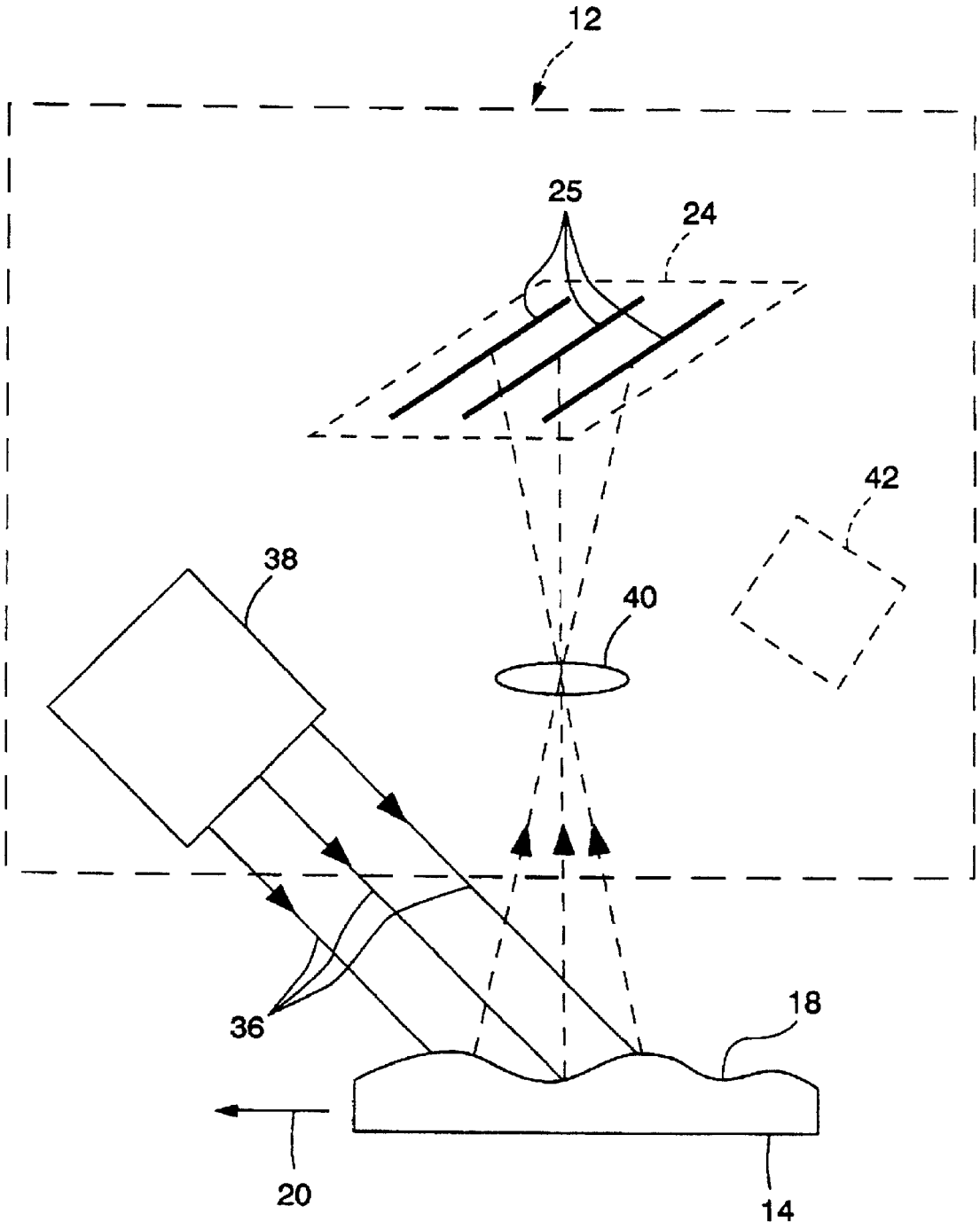
FIG. 2 is a schematic view illustrating the details of a first embodiment of the optical head of FIG. 1.

As illustrated in FIG. 2, a camera of the optical head 12 preferably includes a solid state image sensor such as a trilinear array camera 24. For example, the camera 24 may be the Kodak CCD chip model KLI-2103 which has 3 rows of detector or sensing elements 25 each having 2098 CCD sensing elements per row. Each row is physically separated by a distance equivalent to 8 pixel elements. The camera 24 was originally designed for color scanning with a red, green, and blue color mask over each element, respectively. For the present invention, the masks are not used but rather are removed.

The system bus 26 may be either a PCI, an EISA, ISA or VL system bus or any other standard bus.

The image digitizer/frame grabber 22 may be a conventional three channel color frame grabber board such as that manufactured by Imaging Technologies, or other frame grabber manufacturers. Alternatively, the image digitizer/frame grabber 22 may comprise a vision processor board such as made by Cognex.

The machine vision system 10 may be programmed at a mass storage unit 32 to include programs for image processing and/or image analysis, as described in greater detail hereinbelow.

A monitor 34 is also provided to display images.

Referring again to FIG. 2, generally, multiple images with different phases are obtained by moving the surface 18 of the object 14 while keeping a pattern 36 projected by a light strip projector 38 and the camera 24 stationary with respect to each other within the optical head 12. The optical head 12 (i.e. when the system 10 is a scanning moire system) has no mechanical or optical mechanism that changes the position of the projected pattern 36. To obtain multiple phase images, there is relative movement between the optical head 12 and the measured surface 18.

Although taking images with movement in any direction could result in the ability to obtain phase shifts, there is only discussed herein two specialized cases. The first case is movement of the object 14 in a direction 20 perpendicular to an optical axis of a lens 40 of the camera 24 thereby creating a camera image. The second case is movement of the object 14 in a direction parallel to the optical axis of the lens 40 thereby creating a second camera image.

As with CCD linear array scanning, the object 14 is moved in the direction 20 which is perpendicular to both the optical axis of the linear array camera lens 40 and the line of pixels in the linear array camera 24. Thus, as the linear array camera 24 is read out line by line, the image of the object 14 moving past is created row by row. Using the trilinear array camera 24 for scanning produces three images of the scanned surface 18 with each image being offset by a certain number of rows. This offset is a function of the spacing between arrays and the rate at which the image of the surface 18 is moved past the sensing elements 25.

The concept of scanning phase measuring of the present invention is analogous to the color sensing by the above-noted color trilinear array except the color filters are not present and each of the three scanning lines measures a different phase of the projected light pattern instead of the color.

In terms of phase shifting technology, each scanning line measures a different "bucket," and a three "bucket" algorithm is used on the computer 28 for measuring the phase of the projected light pattern and this phase is proportional to the surface height of the object being scanned.

Before the phase is calculated from the readings at each of the scanning lines, the three scanned images are registered so that the phase information from each of the three buckets is from the same point on the scanned surface. The registration correction and the calculation of the phase could be continuous if the electronics can accommodate this mode of operation.

As described above, three scanning lines are utilized. However, there is no reason that more scanning lines cannot be used to increase the number of buckets used in the phase calculation or to average more than one scan line for a bucket. For example, if one had 16 scanning lines, the sum of lines 1 through 4 could be used for bucket 1, the sum of lines 5 through 8 could be used for bucket 2, the sum of lines 9 through 12 could be used for bucket 3, and the sum of lines 13 through 16 could be used for bucket 4.

Case 2 alluded to above would most likely use a CCD area array in the optical head 1 but could use a linear array or single point photodetector. In this case, as the surface 18 is moved toward or away from the optical head 12, images are taken as the phase of the projection changes. The analysis would consist of correcting for registration between images and then using the images to create the buckets needed for the phase calculation. If the camera images telecentrically or nearly telecentrically, then registration would not be required.

Systems that employ the Case 2 set-up have been described for use in white light interferometry systems as described in U.S. Pat. Nos. 5,398,113 and 5,355,221 but not for a moire (light stripe) application.

Although a method is described above for making phase calculations based on a moire (light stripe) system, the described technique could also be applied to any optical base phenomena where the phase is changed between the images created when moving the object 14 of interest relative to the optical head 12. Techniques that can create this phase change include moire interferometry, white light interferometry, standard monochromatic light optical interferometry, ellipsometry, birefringence, and thermo-wave imaging.

The use of polarization to create an ellipsometer illustrates another optical based phenomena where phase is changed between the images created when moving the object 14 of interest relative to the optical head 12. The adaptation of this scanning phase measuring technique to ellipsometry and birefringence measurement can be understood as an adaptation of a rotating-analyzer ellipsometer (as described at pp. 410-413 of the book entitled "Ellipsometry and Polarized Light," Azzam and Bashara). The rotating-analyzer ellipsometer projects polarized light onto a surface and the polarization of the reflected beam (or transmitted beam depending on geometry) is determined by rotating an analyzer (linear polarizer) in front of the receiving detector. The radiation received at the detector varies as a sinusoidal function that it twice the frequency of the rotating analyzer. The amplitude of the signal is to the degree of linear polarization of the light received at the analyzer and the phase defines the angle of polarization.

Figure 4:
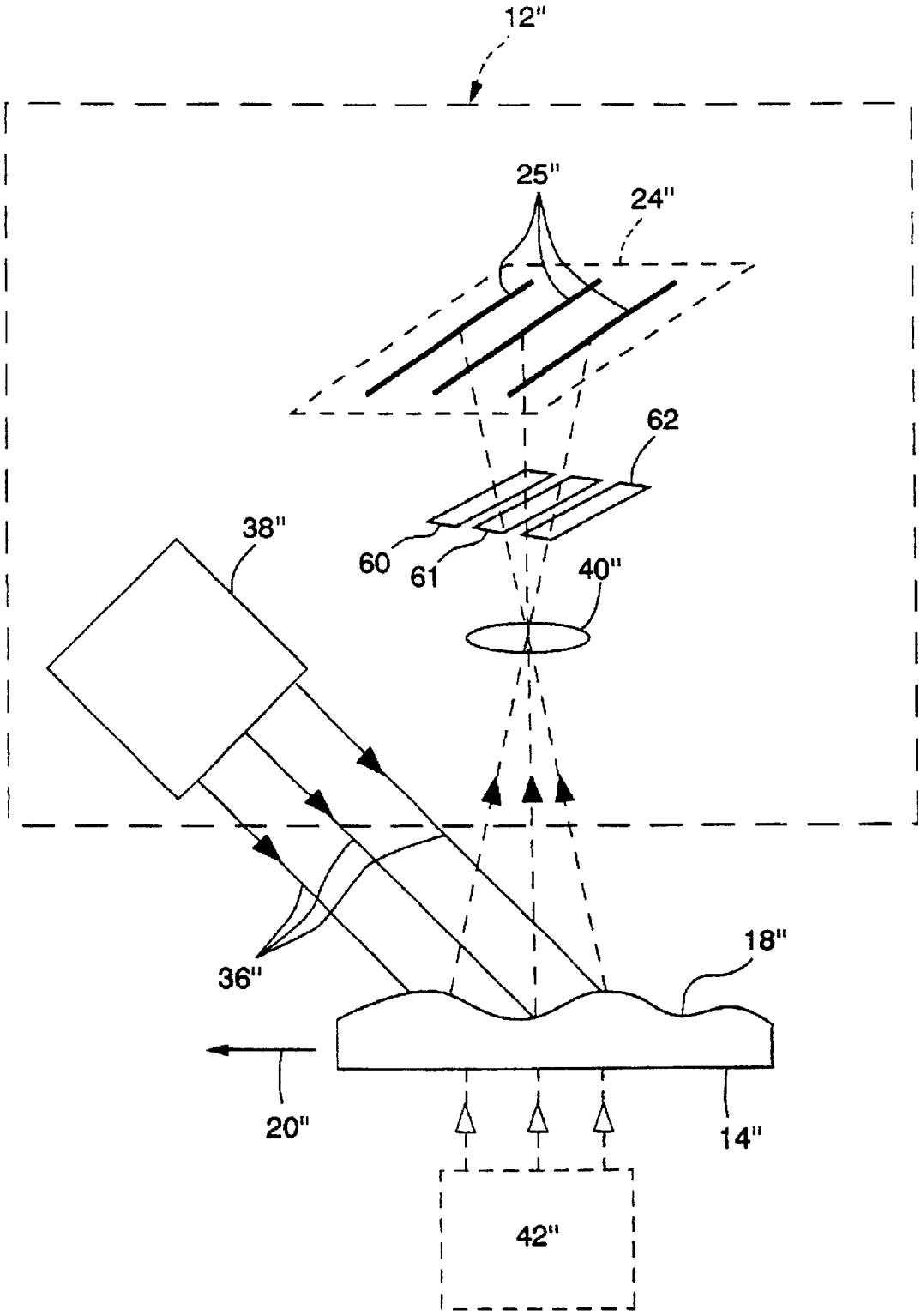
FIG. 4 is a schematic view illustrating another embodiment of the invention wherein a pattern of polarized electromagnetic radiation is projected.

Using the scanning phase measuring technique of the present application, the rotating-analyzer would be replaced by three or more analyzers, each of which would have a row of detector elements (scanning lines) behind it to image the received radiation at difference polarized phase values. The object to be measured would be moved past the fixed projector and detector system on an optical head 12" as shown in FIG. 4, wherein polarized light would be projected (instead of a light stripe pattern as described for a height measuring system). Each of the scanning lines measures a different phase of the sinusoidal polarization signal.

Items in FIG. 4 which have the same or similar structure and/or function to the items in the prior figures have a double prime designation. For example:

Reference numeral 12" designates an optical head of a scanning phase measuring ellipsometer;

Reference numeral 14" designates an object whose polarization response will be measured;

Reference number 18" designates a surface of the object 14" whose polarization response will be measured when using a projector 38";

Reference numeral 20" designates relative motion of the measured object 14";

Reference numeral 24" designates a trilinear array camera having analyzers 25";

Reference numeral 36" designates projected polarized light;

Reference numeral 38" designates a polarized light projector for a standard ellipsometer;

Reference numeral 40" designates an imaging lens; and

Reference numeral 42" designates a polarized light projector for an ellipsometer in a transmission mode (birefringence measuring system).

Reference numerals 60, 61 and 62 designate an analyzer system in front of detector lines wherein 60 designates a linear polarizer parallel to the linear array 24", 61 designates a linear polarizer at 45 degrees to the linear array 24", and 62 designates a linear polarizer perpendicular to the linear array 24".

The example shown in FIG. 4 uses a trilinear array camera 24" with the analyzers (linear polarizers) 25" set at 0°, 45°, and 90° for the three scanning lines. In terms of phase shifting technology, each scanning line measures a different "bucket," and a three "bucket" algorithm is used on the computer for measuring the phase and amplitude of the signal received by this scanning analyzer system.

Referring again to the first embodiment of the invention, the optical head 12 includes the light strip projector 28 and the camera includes the imaging lens 40 for focusing the scanned surface onto the trilinear array 24. The scanned surface is translated past the optical head 12 in the direction of the arrow 20. To eliminate perspective effects in both projection and imaging, the project and imaging system should be either telecentric or nearly telecentric. A nearly telecentric system is created by having the standoff from the optics being much larger than the measurement depth range.

For this discussion, the data from the first linear array in the detector is called b1 (for bucket 1). Likewise, the second and third linear arrays is called b2 and b3, respectively. The pitch of the projected light pattern creates a phase difference of ½ a cycle between b1 and b3. For each linear array, let b1(i,j), b2(i,j) and b3(i,j) designate the light intensity measurement for each linear array with j indicating the pixel number and let j indicating the scan number. For example, b2(25,33) would be the intensity reading of the 25 pixel of the second linear array taken from the 33 scan.

The phase value which is proportional to depth is calculated within the computer 28 using the light intensity reading from the trilinear array as the object 14 is moving uniformly past the optical head 12. The preferred equation is:

$$\text{phase value}(i,j)=\arctan[\{b1(i,j)-b2(ij+m)\}/\{b2(i,j+m)-b3(i,j+2m)\}]$$

where m is an integer that provides the required image shift to match registration between b1, b2 and b3.

In like fashion, the preferred equation for amplitude value is:

$$\text{amplitude value}(i,j)=(((b1(i,j)-b2(i,j+m))^2+(b2(i,j)-b3(i,j+2m))^2)+1/2$$

In some instances, it is desirable to project from more than one angle. For example, projecting from each side of the camera can reduce occlusion problems. Projecting with patterns having different contour intervals (the change in depth for one phase cycle) can be used to eliminate ambiguity if the measurement range is more than one contour interval.

Measurements with more than one projector by including a second projector 42 can be accomplished by cycling the part past the optical head and changing which of the projectors 38 or 42 is on for each cycle. Or, one of the illuminating projectors 38 or 42 can be changed for each scan of the array. For example, assuming two projectors, when j is even, the first projector 38 would be on and when j is odd, the second projector 42 would be on. For calculations to work out properly for this alternating system, then m, the integer shift value, must be even. Thus, using this alternating approach, phase value image for the first projector 38 would be: phase value (i,2j) where j=0,1,2, . . . ; and phase value image for the second projector 42 would be: phase value (i,2j+1) where j=0,1,2, . . . .

Figure 3:
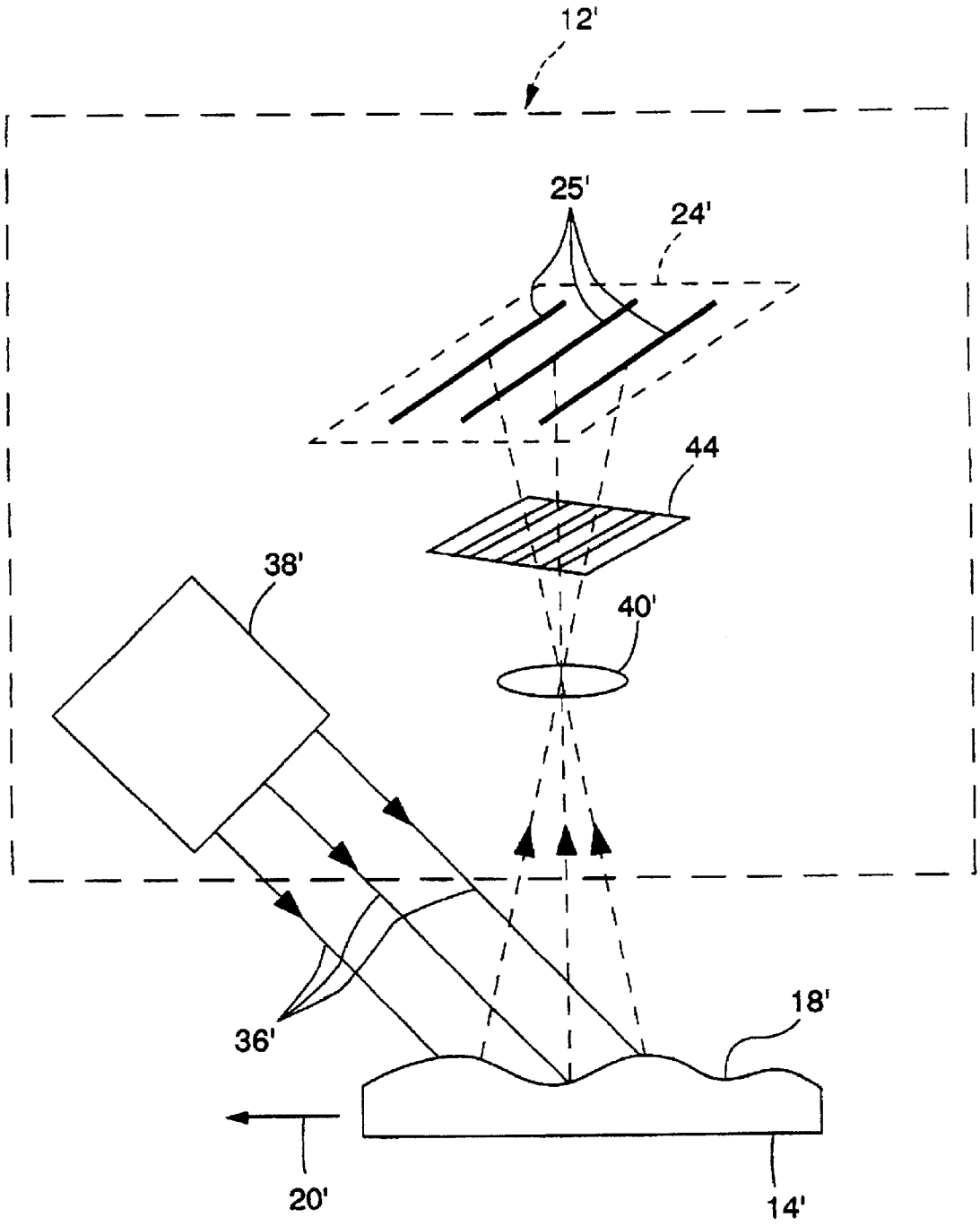
FIG. 3 is a schematic view illustrating a second embodiment of the optical head of FIG. 1 wherein a grating is introduced on the imaging side to create an optical moire pattern.

If it is desirable to increase the pitch of the imaged grating pattern, a second grating 44 can be added to the imaging side as illustrated in FIG. 3. In some instances, it is desirable to include an imaging lens between the grating 44 and the array 24. The parts shown in FIG. 3 which have the same or similar functions to the parts of FIG. 2 have the same reference numeral but a prime designation.

The beat effect between the two grating patterns is the optical moire effect and will increase the pitch imaged onto the detector. This can be desirable when one wants to use a pitch finer than can be resolved by the detector. That is, the primary pitch is less than the width of a pixel.

While the best mode for carrying out the invention has been described in detail, those familiar with the art to which this invention relates will recognize various alternative designs and embodiments for practicing the invention as defined by the following claims.

What is claimed is:

1. A method for high speed, scanning phase measuring of an object at a vision station to develop physical information associated with the object, the method comprising the steps of:

projecting a pattern of imagable electromagnetic radiation with at least one projector;

moving the object relative to the at least one projector at a substantially constant velocity at the vision station so as to scan the projected pattern of electromagnetic radiation across a surface of the object to generate an imagable electromagnetic radiation signal;

receiving the imagable electromagnetic radiation signal from the surface of the object with a detector having a plurality of separate detector elements which are substantially uniformly spaced;

maintaining the at least one projector *and the pattern of imagable electromagnetic radiation* and the detector in a substantially fixed relation to each other;

measuring an amount of radiant energy in the received electromagnetic radiation signal with the detector wherein each of the detector elements produce an image having a different phase of the same scanned surface based on the measurement; and computing phase values and amplitude values for the different phases from the multiple images.

2. The method as claimed in claim 1 wherein the physical information is dimensional information and the imagable electromagnetic radiation is light.

3. The method as claimed in claim 2 wherein the detector has an optical axis and wherein the step of moving is performed in a direction substantially parallel to the optical axis and wherein the projected pattern of light is a stripe of lines.

4. The method as claimed in claim 2 further comprising the step of determining height of the surface of the object based on the phase and amplitude values.

5. The method as claimed in claim 1 wherein the physical information is polarization information, the imagable electromagnetic radiation is polarized, a response of the detector elements is polarization sensitive and wherein the images are based on polarization from the surface.

6. The method as claimed in claim 1 wherein the plurality of detector elements are uniformly spaced and wherein the step of moving is performed uniformly and continuously.

7. The method as claimed in claim 1 wherein the step of computing includes the step of registering the images.

8. The method as claimed in claim 1 wherein the detector elements are elongated in a direction parallel to a detector axis of the detector, and wherein the detector also has an optical axis and wherein the step of moving is performed in a direction substantially perpendicular to the detector and optical axes.

9. The method as claimed in claim 8 wherein the detector is a multi-linear array camera.

10. The method as claimed in claim 8 wherein each detector element is a row of CCD sensing elements extending substantially parallel to the detector axis and wherein the step of moving is performed in a direction substantially perpendicular to the rows of the CCD sensing elements.

11. The method as claimed in claim 1 wherein the step of projecting is performed with two projectors.

12. The method as claimed in claim 11 wherein the step of moving includes the step of cycling the object relative to the two projectors wherein the two projectors alternately project the pattern of imagable electromagnetic radiation.

13. The method as claimed in claim 11 wherein the two projectors alternately project the pattern of imagable electromagnetic radiation during consecutive scans of the projected pattern of imagable electromagnetic radiation.

14. A system for high speed, scanning phase measuring of an object at a vision station to develop physical information associated with the object, the system including:

at least one projector for projecting a pattern of imagable electromagnetic radiation;

means for moving the object relative to the at least one projector at the vision station at a substantially constant velocity so as to scan the projected pattern of imagable electromagnetic radiation across a surface of the object to generate an imagable electromagnetic radiation signal;

a detector for receiving the imagable electromagnetic radiation signal from the surface of the object and having a plurality of separate detector elements which are substantially uniformly spaced for measuring an amount of radiant energy in the imagable electromagnetic radiation signal wherein each of the detector elements produces an image having a different phase of the same scanned surface based on the measurement;

means for maintaining the at least one projector *and the pattern of imagable electromagnetic radiation* and the detector in a substantially fixed relation to each other; and means for computing phase values and amplitude values for the different phases from the images.

15. The [method] *system* as claimed in claim 14 wherein the physical information is dimensional information and the imagable electromagnetic radiation is light.

16. The system as claimed in claim 15 wherein the detector has an optical component for receiving the reflected light signal, the optical component having an optical axis and wherein the means for moving moves the object relative to the at least one projector in a direction substantially parallel to the optical axis and wherein the projected pattern of light is a stripe of lines.

17. The system as claimed in claim 15 further comprising means for determining height of the surface of the object based on the phase and amplitude values.

18. The [method] *system* as claimed in claim 14 wherein the physical information is polarization information, the imagable electromagnetic radiation is polarized, a response of the detector elements is polarization sensitive and wherein the images are based on polarization from the surface.

19. The system as claimed in claim 14 wherein the plurality of detector elements are uniformly spaced and wherein the means for moving moves the object relative to the at least one projector uniformly and continuously.

20. The system as claimed in claim 14 wherein the means for computing includes means for registering the images.

21. The system as claimed in claim 14 wherein the detector elements are elongated in a direction parallel to a detector axis of the detector and wherein the detector also has an optical component having an optical axis and wherein the means for moving moves the object relative to the at least one projector in a direction substantially perpendicular to the detector and optical axes.

22. The system as claimed in claim 21 wherein the detector is a multi-linear array camera.

23. The system as claimed in claim 21 wherein each detector element is a row of CCD sensing elements extending substantially parallel to the detector axis and wherein the means for moving moves the object relative to the detector in a direction substantially perpendicular to the rows of the CCD sensing elements.

24. The system as claimed in claim 14 further comprising two projectors, the two projectors projecting the pattern of imagable electromagnetic radiation.

25. The system as claimed in claim 24 wherein the means for moving cycles the object relative to the two projectors wherein the two projectors alternately project the pattern of imagable electromagnetic radiation during consecutive cycles.

26. The system as claimed in claim 24 wherein [imagable] the two projectors alternately project the pattern of electromagnetic radiation during consecutive scans of the projected pattern of imagable electromagnetic radiation.

27. The system as claimed in claim 14 wherein the at least one projector and the detector at least partially define an optical head.

*28. The method as claimed in claim 2 wherein the detector has an optical axis and wherein the step of moving is performed in a direction substantially perpendicular to the optical axis and wherein the projected pattern of light is a stripe of lines.*

*29. The system as claimed in claim 15 wherein the detector has an optical component for receiving the reflected light signal, the optical component having an optical axis and wherein the means for moving moves the object relative to the at least one projector in a direction substantially perpendicular to the optical axis and wherein the projected pattern of light is a stripe of lines.*

* * * * *